United States Patent [19]

Milewski

[11] Patent Number: 4,513,030
[45] Date of Patent: Apr. 23, 1985

[54] METHOD OF PRODUCING SILICON CARBIDE ARTICLES

[75] Inventor: John V. Milewski, Los Alamos, N. Mex.

[73] Assignee: The United States of America as represented by the United States Department of Energy, Washington, D.C.

[21] Appl. No.: 389,802

[22] Filed: Jun. 18, 1982

[51] Int. Cl.$^3$ .................. B05D 3/10; C23C 11/08; C04B 35/54; C04B 35/80
[52] U.S. Cl. ................ 427/227; 427/228; 427/249; 423/345; 423/346; 501/88; 501/90
[58] Field of Search ............ 423/345, 346; 501/88, 501/90; 428/367; 264/29.2, 29.5, 60, 63, 133; 427/227, 228, 249

[56] References Cited

U.S. PATENT DOCUMENTS

| | | | |
|---|---|---|---|
| 3,205,043 | 9/1965 | Taylor | 423/345 |
| 3,269,802 | 8/1966 | Wainer et al. | |
| 3,369,920 | 2/1968 | Bourdeau et al. | |
| 3,622,272 | 11/1971 | Shyne et al. | 423/346 |
| 3,653,851 | 4/1972 | Gruber | 501/88 |
| 3,991,248 | 11/1976 | Bauer | 428/245 |
| 3,994,822 | 11/1976 | De Bacci et al. | 252/301.1 |

FOREIGN PATENT DOCUMENTS 1417134 12/1975 United Kingdom ............... 423/346

OTHER PUBLICATIONS

Carbon, 12, No. 1, 358–362 (Jan. 1974).
J. Am. Cer. Soc., 33, No. 12, 353–360 (12/1/50).
"Refel-Self Bonded Silicon Carbide", U.K.A.E.A. Reactor Group, Sep. 1973.

*Primary Examiner*—Edward J. Meros
*Assistant Examiner*—Steven Capella
*Attorney, Agent, or Firm*—Elizabeth O. Slade; William A. Eklund; Paul D. Gaetjens

[57] ABSTRACT

A method of producing articles comprising reaction-bonded silicon carbide (SiC) and graphite (and/or carbon) is given. The process converts the graphite (and/or carbon) in situ to SiC, thus providing the capability of economically obtaining articles made up wholly or partially of SiC having any size and shape in which graphite (and/or carbon) can be found or made. When the produced articles are made of an inner graphite (and/or carbon) substrate to which SiC is reaction bonded, these articles distinguish SiC-coated graphite articles found in the prior art by the feature of a strong bond having a gradual (as opposed to a sharply defined) interface which extends over a distance of mils. A method for forming SiC whisker-reinforced ceramic matrices is also given. The whisker-reinforced articles comprise SiC whiskers which substantially retain their structural integrity.

4 Claims, No Drawings

METHOD OF PRODUCING SILICON CARBIDE ARTICLES

BACKGROUND OF INVENTION

The present invention relates generally to reaction bonded silicon carbide articles and to methods of preparation thereof and more particularly to silicon carbide-graphite articles of manufacture and to methods of producing such articles. The invention is a result of a contract with the Department of Energy (W-7405-ENG-36).

In ceramic matrix technologies, there has been a need for high performance structural ceramic composites made of silicon carbide (and optionally including some graphite). These have been needed, for example, for liners of fusion reactors and for turbine blades and stators. Other applications have been for tubular heat exchangers, recuperators, and regenerators. However, because silicon carbide is a refractory material, it is made into complex shapes with great difficulty.

Whiskers (i.e., fibers which have been grown under controlled conditions that lead to the formation of high-purity single crystals in fiber form) of silicon carbide are known to have great strengths. It would be desirable to use such whiskers to reinforce ceramic composites. However, incorporating such whiskers into ceramic composites has been difficult because blending the whiskers with the ceramic powder followed by cold pressing, hot pressing, or extruding will severely damage the whiskers and reduce their reinforcement ability.

On the other hand, graphite and carbon can be easily formed into a wide variety of shapes and sizes (e.g., by machining, by extruding precursors of graphite, and by other means). Therefore, it would be highly desirable to be able to use the graphite and carbon shapes as forms and to convert those forms to silicon carbide, with the silicon carbide conversion extending to any chosen depth within the original carbon or graphite structure. It would also be very desirable to obtain whisker-reinforced ceramic matrix composites in which the integrity of the whiskers has been preserved.

It is known that silicon monoxide (i.e., SiO) and carbon (C) react to form silicon carbide (SiC). It has been generally known that a thin surface layer of SiC has formed as a by-product in various reactions. During the growth of SiC whiskers on a carbon substrate in which SiO and $CH_4$ gases are present, not only are SiC whiskers grown at each catalyst site but most of the surrounding areas of carbon are surface converted to SiC by the presence of low concentrations of SiO gas in the atmosphere about the carbon substrate.

To date, attempts to obtain economically good ceramic structures made of SiC have included forming a mixture of powder of carbon or graphite with powdered silicon and then heating that mixture, so as to melt the silicon in the presence of the carbon so they will react to form silicon carbide. This procedure, however, has the drawback of forming a silicon carbide material with a high degree of porosity since the mixture of pressed powders has pores; and the conversion process is not a densification process by the addition of new matter (i.e., only old material is reacted to change form). Furthermore, the articles of manufacture produced by this process may not be formed completely of silicon carbide because of inadequate mixing and dispersion of the initial silicon and carbon powders or because they may not have been held long enough to complete the diffusion. Also, as the SiC is formed, the articles shrink because the bulk volume of SiC is less than that of carbon or silicon alone.

Another procedure is disclosed in De Bacci et al., "Preparation for Storage of Fission Products," U.S. Pat. No. 3,994,822. In this process, objects made of carbon or graphite are situated within a bath of liquid silicon and form silicon carbide articles of manufacture. This process would involve difficulties in working with a large volume of hot liquid metal in an inert atmosphere, and it is believed that the liquid would not have great penetration ability into fine pores due to its liquid viscosity and rate of reaction. Furthermore, the liquid would react mostly with the surface.

Other attempts to obtain good ceramic structures economically have included coating materials with silicon carbide by decomposing a silane, $CH_3SiCl_3$, (as disclosed, for example, in L. Aggour et al. "CVD of Pyro-Carbon SiC, TiC, TiN, Si, and Ta on Different Types of Carbon Fibers," *Carbon*, 1974, vol. 12, pp. 358-362) and by chemical vapor deposition reactions (such as are disclosed in Bauer, U.S. Pat. No. 3,991,248, in Bourdeau; U.S. Pat. No. 3,369,920; and in Wainer, U.S. Pat. No. 3,269,802). In such reactions, however, the external volume of the object being coated increases as the coating reaction proceeds. Furthermore, as the thickness of the coating increases, problems of bonding the coating to the substrate increase. This is in contradistinction to a conversion process wherein the substrate itself is converted, rather than merely coated.

Therefore, despite what has been known in the prior art, a need has existed until now for a method of easily and economically making silicon carbide structures of the same sizes and shapes as the sizes and shapes in which graphite and carbon can be obtained.

SUMMARY OF THE INVENTION

Objects of this invention are a method of economically making objects comprising silicon carbide, having good mechanical strengths, and having little or no problem of bond breakage between the converted SiC portions and the original carbon (and/or graphite) matrix.

Other objects of this invention are an economical method of making objects consisting of silicon carbide.

Further objects of this invention are a method of easily incorporating SiC whiskers, SiC fibers, or SiC filaments into ceramic matrix composites and the articles thus produced.

A further object of this invention is an inexpensive article of manufacture made at least partially of silicon carbide whiskers and having any chosen shape and size in which carbon or graphite can be formed.

A still further object of this invention is an article of manufacture in which silicon carbide is located near the exterior surface of an inner graphite structure, wherein the article will have substantially improved shear strength between the carbon core and the heavily converted SiC surface as compared with coated graphite and carbon substrates (this improvement being a direct predicted result of the graded density interface).

Yet another object of this invention is an article of manufacture which is a ceramic matrix composite in which silicon carbide whiskers, or alternatively any compatible refractory fibers with similar thermal expansion (e.g., SiC filaments or boron filaments), are incorporated.

Additional objects, advantages and novel features of the invention will be set forth in part in the description which follows, and in part will become apparent to those skilled in the art upon examination of the following or may be learned by practice of the invention. The objects and advantages of the invention may be realized and attained by means of the instrumentalities and combinations particularly pointed out in the appended claims.

To achieve the foregoing and other objects, and in accordance with the purposes of the present invention, as embodied and broadly described herein, the method of forming a product comprising silicon carbide which has been reaction bonded to an inner carbon or graphite structure comprises: (a) generating silicon monoxide (SiO) gas in substantial concentration in close proximity to the structure; and (b) allowing the SiO gas to contact the structure at reaction conditions which allow the SiO gas and the carbon or graphite to react in-depth to form silicon carbide (SiC) from the structure by in-depth conversion of the structure (which does not grow or shrink in external size during the conversion), as opposed to surface coating of the structure (in which the structure would grow in size during surface coating) and as opposed to sintering of C and Si (in which the article shrinks). It has been found that when SiO gas is present at the surface of the carbon or graphite structure at a volume percent within the range from about 5 to about 50, the SiO gas will penetrate the structure and convert it to SiC to an inner depth on the order of several millimeters within 12 hours when the reaction temperature is within the range from about 1,500° to about 1,550° C., as is described in Example 1 below.

Although SiO has reacted with carbon or graphite in the prior art to form SiC as a by-product, that reaction has not until now been used to full advantage because the SiO has been present only in low concentration (i.e., 0 to 1 volume percent, v/o). By the process of the invention, however, it is required that SiO gas be generated in substantial concentration (i.e., greater than 5 v/o and generally less than 50 v/o and made available in close proximity to the graphite structure to be converted.

The present invention also comprises, in accordance with its objects and purposes, articles of manufacture comprising silicon carbide and graphite (and/or carbon), wherein the silicon carbide and the graphite (and/or carbon) are reaction bonded together and merge gradually into each other in a graduated interface (as opposed to a sharply defined interface) over a distance of at least 50 to several hundred microns (as opposed to 1 to 20 microns, which is typical of an interface from a coating process).

DESCRIPTION OF PREFERRED EMBODIMENTS OF THE INVENTION

In the practice of the method of the invention, it is required that the volume percent of SiO gas that contacts the surface of the substrate (which is made either of graphite or carbon) be quite high (i.e., within the range from about 5 to about 50 volume percent SiO gas) and that that concentration be maintained during the time of reaction (described below). Lower concentrations will require conversion times too long to be economical. It is generally difficult to obtain greater than 50 v/o SiO because the SiO generation process is usually performed in hydrogen or other carrier gas (which is normally used in at least a 50 v/o dilution.

Contrary to other methods where only the surface is coated, Si is here delivered *into* the porous graphite structure, both converting and filling by adding mass (of elemental silicon) within the composite, thereby densifying the structure while external dimensions are held constant.

Achieving this high concentration of SiO gas will be done by one of the following methods, each of which generates SiO gas in close proximity to the substrate, thus producing SiC to an extent such that it is much more than a mere by-product of another reaction.

The reaction for forming gaseous SiO is as follows:

$$SiO_2 + H_2 \rightarrow SiO + H_2O \qquad (1)$$

This reaction takes place at temperatures above about 1350° C.

In order to use the reaction given in Equation 1 above, SiO is generated in the practice of the invention by either of the following procedures.

In the first procedure, a porous brick that is high in silica content is sliced into thin sections of about 5 to 20 millimeters thick. The sliced brick is then used to enclose the graphite substrate which is to be converted in whole or in part to SiC. When the brick is exposed to a dry hydrogen atmosphere at a temperature of at least about 1400° C., the $SiO_2$ reduction of Equation 1 takes place, slowly releasing SiO gas. A typical brick will convert about 3 to about 10 percent of its $SiO_2$ material to SiO per hour depending on its geometry, temperature, and hydrogen gas flow.

Alternatively, in the second procedure, instead of bricks, $SiO_2$ powder can be used to encase the graphite substrate to be converted by the reaction with hot hydrogen gas.

The SiO gas that is generated in Equation 1 listed above is used to penetrate the graphite or carbon substrate and to convert the substrate to a substrate of SiC. This is a quite different process (as described below) from coating a graphite substrate with SiC, such as is described in Bauer, Wainer, and Bourdeau, cited above. In coating a partial vacuum is generally used, resulting in low concentrations of reactants; and often imperfections due to holding devices result.

During the SiC conversion process here used, the SiO gas penetration and subsequent conversion is temperature and time dependent. For example, an exposure of 16 hours at 1400° C. converts the surface of a carbon or graphite substrate to a depth of about ½ mm, whereas at 1500° C. the conversion depth would be 2 to 3 mm. Longer times and higher temperatures will convert the carbon or graphite substrate to further depth. The temperature required for this conversion is at least about 1350° C., which temperature is required to allow the reaction to proceed to any extent at all. However, preferably the temperature will be at a minimum within the range from about 1425° to about 1450° C. in order to obtain a measurable reaction rate. And, more preferably, the minimum reaction temperature will be within the range from about 1500° to about 1550° C. in order to get a good reaction rate without undesirable side effects. If a reaction temperature of about 1575° to 1600° C. or higher is used, side reactions may occur, including (A) $H_2O + C \longrightarrow CO + H_2$ and (B) $2H_2 + C \longrightarrow CH_4$. Such side reactions can cause the original carbon (and/or graphite) structure being converted to shrink in size. However, these side reactions can be reduced and the temperature of the SiC-forming reaction can be higher than 1600° C. if appropriate chemical procedures are used. Such procedures include adding CO or CH$_4$ to drive Reactions A and B to the left.

Sufficient time for the conversion reaction is required to allow the conversion to continue to the chosen depth in the graphite (and/or carbon) structure. As described above, the time chosen will be a function of the temperature of conversion and the desired depth of conversion (which will be a function of the geometry and size of the part that is being converted). Larger parts with many complex internal passageways will require more time for diffusion to occur into all intricate areas.

The pressure in the reaction vessel is usually about one atmosphere in order for the conversion to proceed at a satisfactory rate. It is also believed that the reaction can be run at partial atmospheres or multiple atmospheres as long as the volume percent of SiO gas is maintained in the 5 to 50 v/o range. This is different from greatly reduced gas concentrations due to reduced pressures which are generally used in chemical-vapor deposition reactions in order to obtain coating of interior portions of substrates.

The substrate to be converted can be made either of carbon or graphite or any precursor material that will easily convert into carbon or graphite, for example pitch or phenolic-based resins.

The substrate can have a wide posority range, as low as a few percent and up to 90 or more percent. Additionally, the porosity should be continuous.

The shape of the carbon and/or graphite substrate to be converted to SiC should preferably be made with as uniform a cross-sectional thickness as possible and in a geometry that will permit access of most of the surfaces to the SiO conversion gases. However, any shape in which carbon or graphite can be found or made is thought to be suitable for conversion. The size of the part is only limited to the size of the atmosphere furnace that is available for use.

In the method of the invention, it is also important to pack internal surfaces such as the insides of tubes with the SiO generating material if SiC conversion is desired in that area.

The following procedure which is believed to be new and unobvious can be used to form SiC whisker reinforced ceramic matrix composites having high whisker integrities which could not be made in the prior art due to difficulties in incorporating SiC fibers into an abrasive SiC matrix without destruction of the fibers. In the prior art processes, mixing and hot-pressing with ceramic powders is extremely damaging to the whisker integrity. The SiC whiskers are here first dispersed or mixed with carbon or graphite particles of a size chosen for good mixing and efficient packing (e.g., particles having diameters equal to or less than fiber diameters). This mixing is gentle and non-destructive to the whiskers and is done in a solvent-thinned phenolic resin. The resin bonded and coated fibers and particles are then spread out to allow the solvent to evaporate. Then the phenolic resin-coated fiber-powder mixtures are pressed or molded into the shape in which the resin will finally be cured. Next, the resin-bonded composite is slowly heated to about 800° C. to carbonize the resin. This carbon-bonded whisker reinforced composite is then treated as described above for the SiC conversion. At the conversion temperatures used, the SiC whiskers are stable and can be identified in the structures after conversion.

EXAMPLES

The following examples which illustrate the invention were carried out. In each of the following examples, tubes consisting of carbon or graphite with 40% by volume of SiC powder were used and had an overall density of about 2.3 g/cc. Although these substrates were not made solely of carbon or graphite, such substrates can alternatively be used in the processes described below because planar structures of carbon and graphite have been converted successfully.

The composite tubes were made by an extrusion process, using the following composition and procedures. SiC powder (obtained from Starck Company, B-10, having average particle size of 2.38 microns) was dry mixed with graphite powder (200 mesh, reactor grade, Hi CTE, obtained from Spear Carbon Co.) in a jar roller. Next, resin (which was Varcum Phenolic with 4% catalyst maleic anhydride, obtained from Varcum Div. of Reichold Chemical Co.) was added, and the mixture was thinned to about 50% with acetone (technique grade, which can be obtained from any chemical supply house). The mixture was hand mixed with a spatula in the jar to a smooth consistency. This mixed material was then spread out thinly on a tray and heated to about 50° C. to evaporate the acetone solvent. The mixture was then extruded to the shape of a tube. The tube was first heated for 16 hours at 200° C. to cure the resin. Then, the resin was carbonized by a slow heating to 800° C. at a rate of 100° C. per hour. After carbonization, the carbon was converted into graphite by gradually heating up to 2000° C. in 4 hours and holding at 2000° C. for 2 hours. This final graphite conversion step is not necessary for the SiC conversion process, however, The SiC powder-filled graphite (and/or carbon) composite tubes that were formed in the above-described way were then subjected to the following SiC conversion process. The composite tubes were packed in a frame of K30 brick (which can be obtained from Babcocks and Wilcox Company), so that the tubes were completely enclosed within parallel layers of bricks. The bricks were set on a solid carbon tray to facilitate handling. This assembly was 19 centimeters long, 6 centimeters wide, and 6 centimeters high.

This assembly was then inserted into a 7.62 centimeter diameter hydrogen atmosphere tube furnace and was then heated. In each of the examples described below, the heating procedure varied somewhat.

EXAMPLE 1

In this Example, a tube furnace (as descrbed above) was flushed with dry hydrogen (e.g. −50° C. dew point or lower) at a rate of 1500 cubic centimeters per minute, while the composite tube and assembly were heated to 1500° C. in about 4 hours, were held at that temperature for 12 hours, and were then cooled to 600° C. before the composite tube and assembly were removed from the tube furnace. These reaction conditions gave complete penetration conversion through the 1.5 millimeter thick composite tube wall. This was evidenced by visually observing a cross-section of the composite tube at a magnification of 50×. At that magnification, the composite tube in its original condition had small, white areas (which were the original SiC powders) interspersed within large, dark grains (which were graphite powder). Also present was a grey background (located uniformly throughout the composite tube) which was the carbon and fine graphite that were formed from the original phenolic resin after the tube was formed and after the resin was converted to carbon and graphite.

After the reaction-bonding SiC conversion, a magnified photograph of a cross-section of the converted composite tube showed that the entire cross-section had a white color and had the grain structure of SiC (with about 20% void space) and thus was completely converted to SiC.

EXAMPLE 2

In this Example, a tube prepared as described above in an assembly as described above was processed at a temperature of about 1400° C., instead of 1500° C. The other variables were the same as those described in Example 1 above.

Using these lower temperature reaction conditions, the composite tube exhibited partial penetration and thus partial conversion of the carbon (and/or graphite) in the composite tube. As seen in a photomicrograph at 50× of a cross-section of the composite tube, the exterior of the tube after the procedure was completely white and the interior of the tube was as it had originally appeared before the reaction with hydrogen. These two zones gradually merged into each other and produced a graduated interface at about 30% depth penetration level as measured from the exterior surface.

EXAMPLE 3

In this Example, the converted tube from Example 1 was reimpregnated with the resin described in Example 1 and reconverted to carbon by the following procedure, for the purpose of increasing the density of the tube. The SiC-converted tube was vacuum impregnated with a solution consisting of a 50—50 volume mixture of acetone and phenolic resin (4% catalyst as described above). After impregnating, the tube was dried slowly (overnight at about 50° C.) to extract all solvent and to leave the resin in place within the voids of the SiC converted tube. This tube was then heated as described in Example 1 to first cure the resin and to then carbonize it. Thereafter, the reimpregnated and carbon converted resin in the structure was reconverted to SiC by the procedure described in Example 1 by packing it in K30 brick and heating it in a hydrogen furnace at 1500° C. for 12 hours.

This process resulted in a substantial reduction in porosity down to 5% (with a specific gravity of 3.0), as opposed to the 20% porosity which had been obtained in Example 1 (with a specific gravity of 2.6). The conversion to SiC was complete as determined by microscopic examination.

The foregoing description of preferred embodiments of the invention has been presented for purposes of illustration and description. It is not intended to be exhaustive or to limit the invention to the precise forms disclosed, and obviously many modifications and variations are possible in light of the above teaching. The embodiments were chosen and described in order to best explain the principles of the invention and its practical application to thereby enable others skilled in the art to be utilize the invention in various embodiments and with various modifications as are suited to the particular use contemplated. It is intended that the scope of the invention be defined by the claims appended hereto.

What is claimed is:

1. A method of forming a shaped product having a surface layer of silicon carbide (SiC) reaction bonded to an inner structure consisting essentially of carbon, comprising the steps of:
    (a) generating SiO gas at a concentration of between about 5 and 50 volume percent by heating solid silicon dioxide ($SiO_2$) to a reaction temperature of between approximately 1500° and 1550° C. in an atmosphere of hydrogen, said solid silicon dioxide being in the form of a powder surrounding said structure:
    (b) contacting said structure with said SiO gas at said reaction temperature of between approximately 1500° C. and 1550° C. for a period of time sufficient to form a layer of SiC on the surface of said structure by chemical conversion of carbon in said structure to SiC, whereby a layer of reaction-bonded SiC is formed on the surface of said structure without significantly changing the dimensions of said structure.

2. A method according to claim 1, wherein said $SiO_2$ is at least part of the composition of silica containing bricks which are sliced or powdered and fitted to surround said structure.

3. A method according to claim 2, wherein said reaction time is about 12 hours, wherein the thickness of the layer of said conversion to SiC extends within said structure to about 1.5 millimeters, and wherein the density of said structure after conversion is about 2.6 $g/cm^3$ (and has about 20% porosity.

4. A method of producing articles of manufacture which are reinforced with silicon carbide (SiC) whiskers, without destroying the integrity of the whiskers, comprising the steps of:
    (a) dispersing and mixing SiC whiskers in a mixture of solvent and resin with carbon or graphite particles of a size chosen from good mixing and efficient packing, so as to form resin bonded and coated fibers and particles;
    (b) allowing the solvent to evaporate from said mixture;
    (c) forming said resin bonded fibers and particles into a final shape in which said resin will finally be cured;
    (d) heating said final shape to about 800° C. to carbonize said resin and so as to form a carbon-bonded SiC whisker reinforced composite structure which is a non-abrasive matrix in which the whiskers maintain their structural integrity;
    (e) generating SiO gas at a concentration of at least 5 volume percent by heating solid silicon dioxide ($SiO_2$) to a reaction temperature of between approximately 1400° and 1600° C. in an atmosphere of hydrogen; and
    (f) contacting said SiC whisker reinforced composite structure with said SiO gas at said reaction temperature of between approximately 1400 C. and 1600° C. for a period of time sufficient to convert at least some of the carbon in said structure to SiC, whereby there is formed a structure containing SiC as well as SiC whiskers, and wherein said whiskers are not damaged by the fabrication process.

* * * * *